United States Patent [19]

Sitta et al.

[11] Patent Number: 4,570,504
[45] Date of Patent: Feb. 18, 1986

[54] AUTOMATICALLY DISENGAGEABLE GEARING

[75] Inventors: Jaroslav Sitta; Antonin Schiebl, both of Zabreh na Morave, Czechoslovakia

[73] Assignee: Zavody silnoproude elektrotechniky koncern Praha MEZ Mohelnice, koncernovy podnik, Mohelnice, Czechoslovakia

[21] Appl. No.: 536,244

[22] Filed: Sep. 27, 1983

[51] Int. Cl.[4] .............................................. F16H 57/10
[52] U.S. Cl. ...................................... 74/411; 74/406; 74/422
[58] Field of Search ......................... 74/422, 411, 406

[56] References Cited

U.S. PATENT DOCUMENTS

| | | | |
|---|---|---|---|
| 959,826 | 5/1910 | Willi | 74/406 |
| 1,486,144 | 3/1924 | Jarrell | 74/422 |
| 2,376,161 | 5/1945 | Maud et al. | 74/422 |
| 3,192,799 | 7/1965 | Pamplin | 74/411 |
| 3,447,388 | 6/1969 | Darnell | 74/422 |
| 4,273,995 | 6/1981 | Devanney | 74/411 |

FOREIGN PATENT DOCUMENTS

| | | | |
|---|---|---|---|
| 977183 | 11/1975 | Canada | 74/422 |
| 74247 | 11/1960 | France | 74/422 |
| 1352844 | 10/1962 | France | 74/422 |

*Primary Examiner*—Ronald C. Capossela

[57] ABSTRACT

Gearing mechanism providing for the automatic engagement and disengagement in a radial direction between successive gears in a gear train. A first gear, shown in the form of a rack gear, has a plurality of teeth traveling in a fixed path in space. Selectively meshing with the first gear is a second gear in the form of a pinion mounted upon a driving shaft, frictionally driven by the shaft, and having a degree of radial freedom of movement with respect to the shaft which is such that when the force opposing the driving of the first gear by the second gear exceeds a predetermined desired value the second gear is automatically driven out of mesh with the first gear. The two gears are restored to their initial meshing engagement by a further rotation of the second gear in the same direction through a predetermined angle.

4 Claims, 4 Drawing Figures

AUTOMATICALLY DISENGAGEABLE GEARING

This invention relates to gearing which automatically disengages upon its subjection to more than a predetermined load.

Hitherto known systems for automatically disengaging gears permit at most the mutual axial connection and disconnection of one stationary gear and one rotating gear, e.g., the gear drive of the starter of an automobile. There exists no system for the connection and disconnection of gears in a direction radial thereof and for a pinion-rack gear embodiment.

In one embodiment of gearing system in accordance with the invention a driving pinion is mounted upon a driving shaft which rotates about an axis disposed at a fixed distance from the path of travel of a rack gear which is disposed for selective meshing with the pinion. The pinion is disposed between two axially spaced friction discs which are resiliently thrust toward each other and into frictional engagement with the pinion. The pinion is provided internally thereof with a clearance which is twice as great as the tooth height of the pinion so that, when the load upon the rack gear exceeds a predetermined value the reaction between the teeth on the pinion and the teeth on the rack thrusts the pinion away from the rack so that the rack is no longer driven by the pinion. Continued rotation of the shaft and the pinion mounted thereon, which is now disposed eccentrically of the driving shaft, causes the pinion upon its rotation by the shaft approximately 180°, again to come into mesh with the rack gear.

In order that the invention may be clearly understood and readily carried into effect, a preferred embodiment thereof is, by way of example, hereinafter more fully described and illustrated in the accompanying drawings, wherein.

Figure 1:
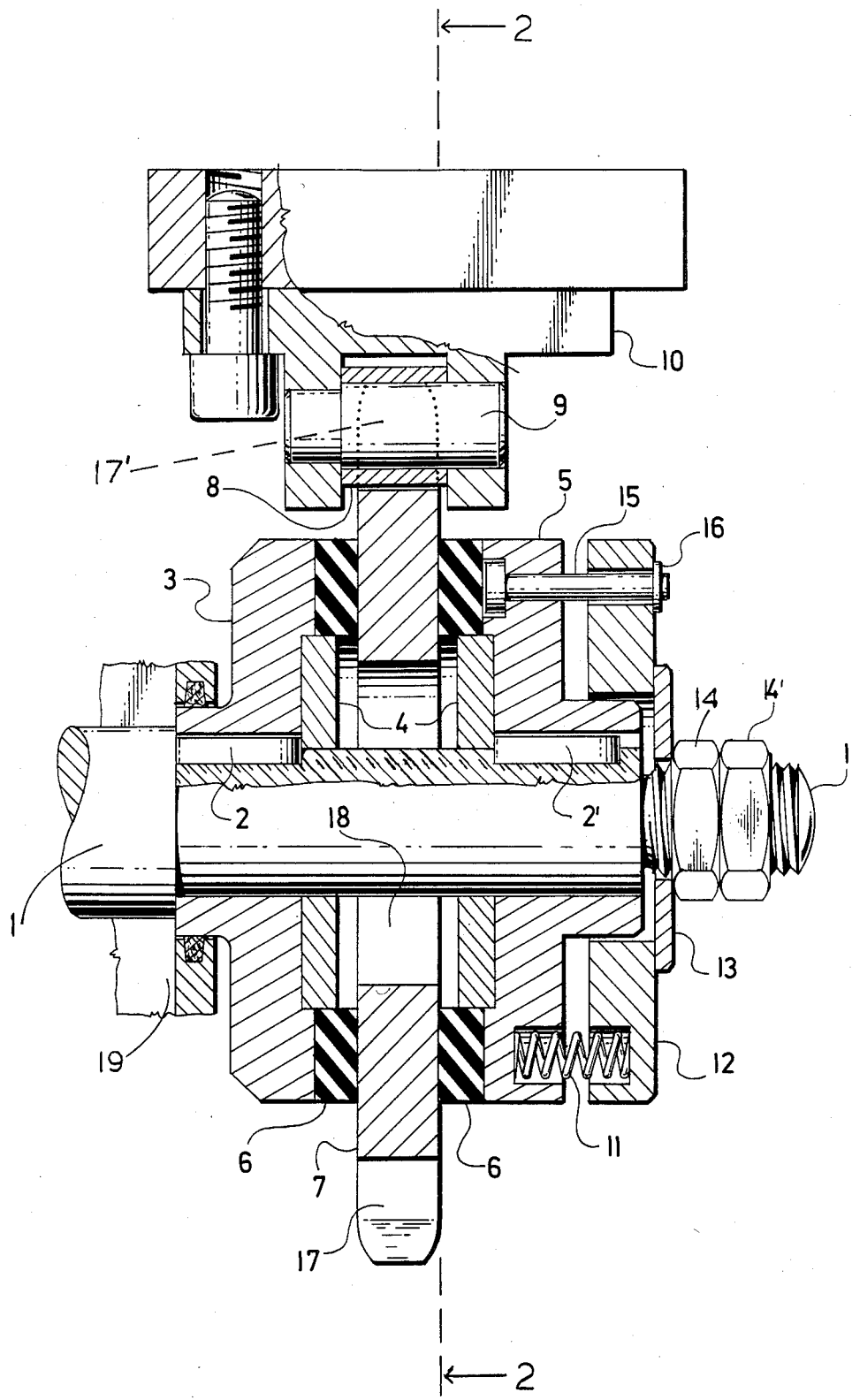
FIG. 1 is a view partially in vertical axial section along lines 1—1 in FIG. 2 and partially in end elevation of a preferred embodiment of gearing mechanism in accordance with the invention, said system incorporating a rack gear and a pinion, the pinion and rack gear being shown in meching engagement.

Turning first to FIG. 1, a pinion 7 in the form of a spur gear having a large central cylindrical opening 18 therein is telescoped over a driving shaft 1 rotatably supported in a bearing 19. Pinion 7 has a plurality of teeth 17 located on its periphery. When the pinion 7 is in the position shown in FIG. 1 at least one of its teeth, designated 17', is in mesh with at least two of a plurality of projections or teeth each made up of a sleeve 8 mounted for rotation on a pin 9 disposed on a rack gear 10 and spaced longitudinally therealong. The teeth 8, 9 are also those of spur gear form. When the force opposing the longitudinal movement of the rack gear 10 exceeds a desired predetermined value, the flank surface of at least one of the teeth 8, 9 on the rack gear exerts a force upon the flank surface of the tooth or teeth on the pinion 7 in mesh with the teeth on the rack gear, tooth 17' on pinion 7 being such tooth in this construction, that the pinion 7 in the course of a portion of one revolution of shaft 1 and the pinion 7 is forced downwardly from the position thereof shown in FIG. 1 to one such as shown in FIG. 4 wherein the teeth 17 on the pinion 7 are no longer in engagement with the teeth or projections 8, 9 on the rack gear 10.

Figure 2:
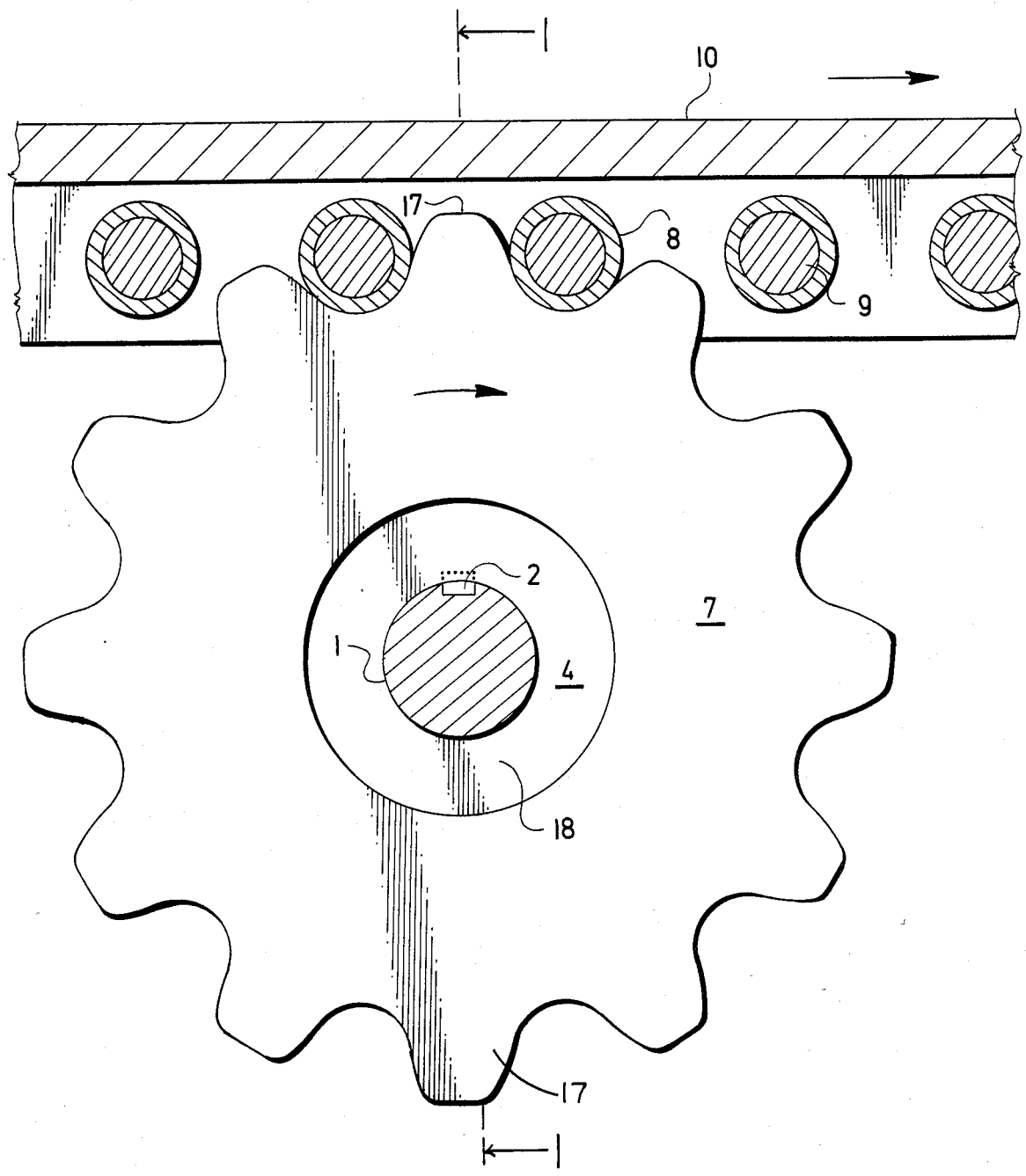
FIG. 2 is a view in cross-section through the mechanism of FIG. 1, the section being taken along the line 2—2 in FIG. 1.
Figure 3:
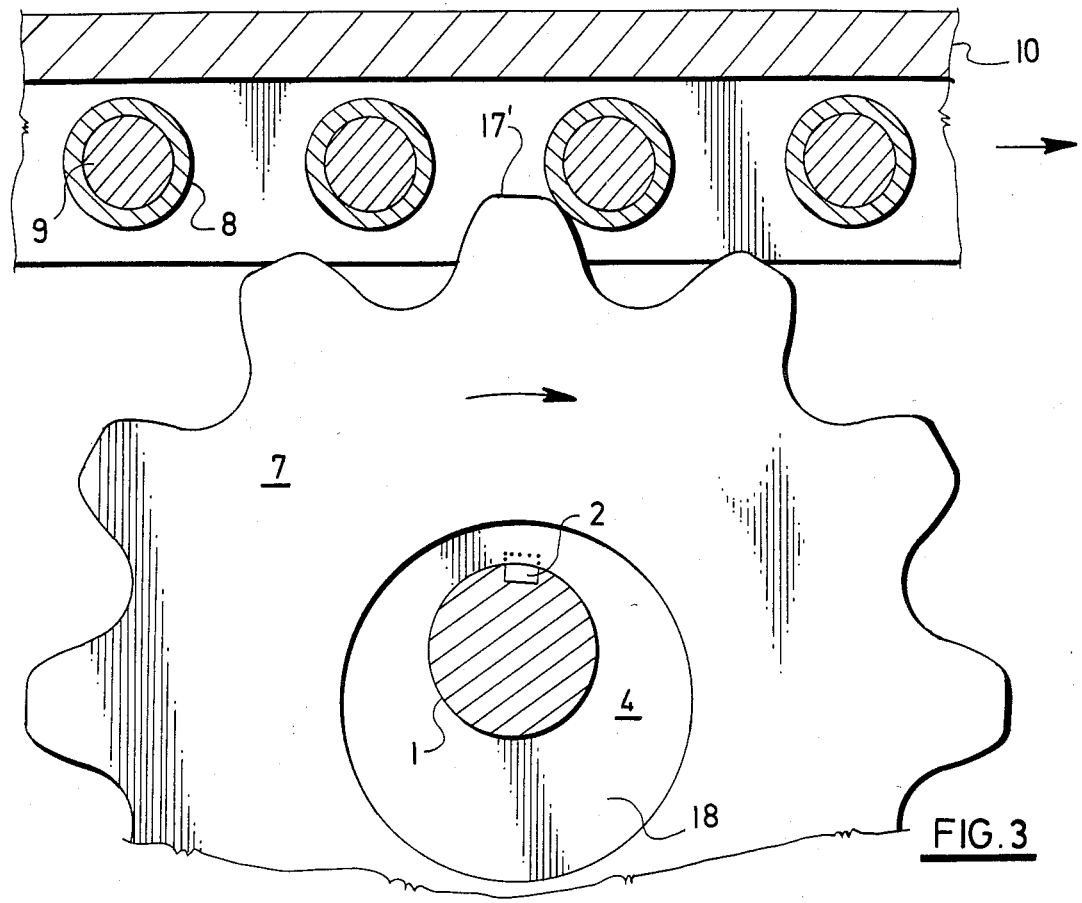
FIG. 3 is a view similar to FIG. 2 but with the pinion starting to be disengaged from the rack gear upon the subjection of the rack gear to a force opposing the driving force thereon which exceeds a predetermined value.
Figure 4:
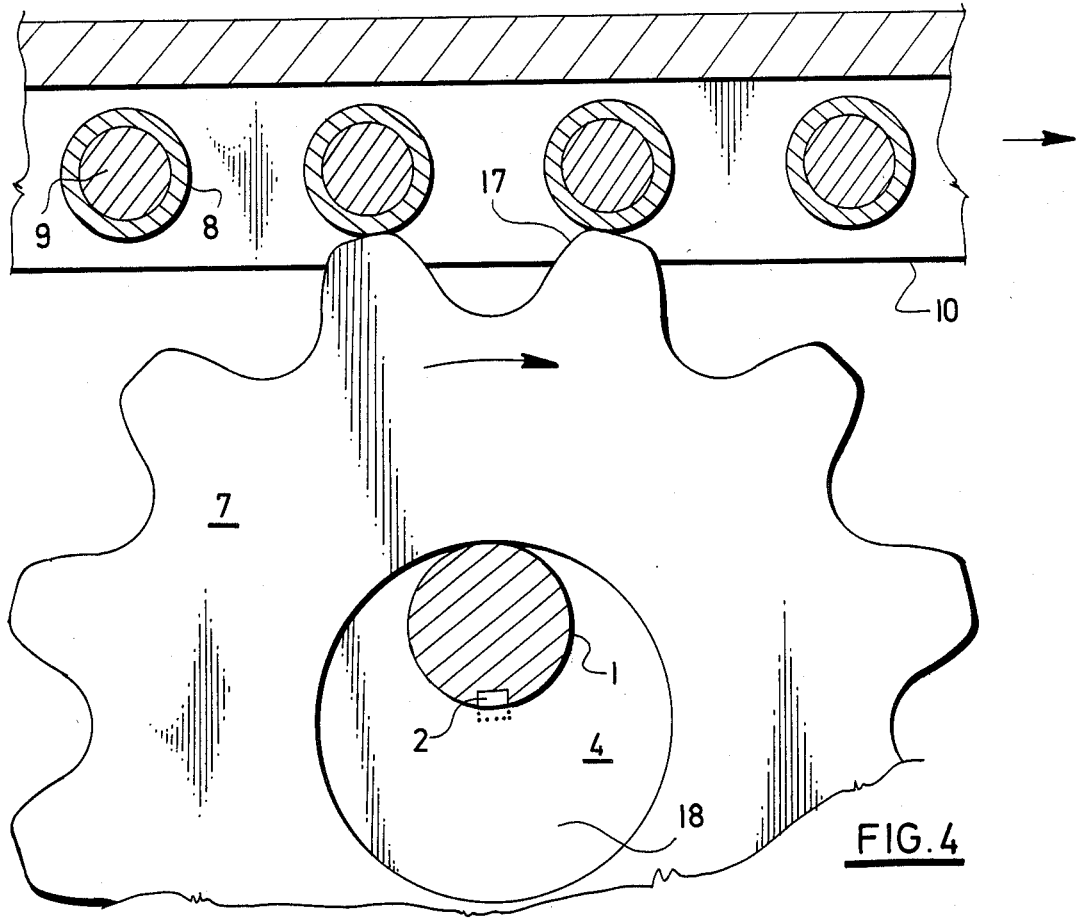
FIG. 4 is a view similar to FIGS. 2 and 3 but showing the pinion completely disengaged from the rack gear and the rack gear at rest.

Such action is progressively illustrated in FIGS. 2, 3 and 4; FIG. 2 shows the position of the pinion 7 which it has in FIG. 1. FIG. 3 shows the tooth 17' on the pinion 7 approaching a position wherein it is completely disengaged from the tooth 8, 9 on the rack gear 10 which it has driven to the right, and FIG. 4 showing a condition of complete driving disengagement between the teeth 17 on the pinion 7 and the teeth 8,9 on the rack 10. After the shaft 1 and the pinion 7 have been additionally turned through a substantial angle being somewhat less than 360°, the teeth 17 on pinion 7 are again restored to the positions thereof shown in FIGS. 1 and 2, wherein the teeth 17 on the pinion mesh with the teeth 8, 9 on the rack gear 10. It can be seen by comparing FIGS. 2, 3 and 4 that the action of disengaging the teeth on the pinion with those on the rack gear involves a displacement of the pinion 7 from the position thereof (FIGS. 1 and 2) wherein it lies concentric with the shaft 1 to one in which it has been displaced to a position eccentric of the shaft 1 (FIG. 4) in which the distance of the geometrical center of the pinion 7 then lies spaced from the axis of shaft 1 a distance which is at least equal to the radial height of the teeth 17 on the pinion 7.

To permit such radial motion of the pinion 7 while maintaining a yielding driving relationship with the shaft 1 the pinion 7 is mounted upon the shaft 1 and driven thereby in the following manner. As above noted, shaft 1 is mounted for rotation in a fixed bearing 19, as shown in FIG. 1. A first, left hand or back flange 3 is keyed to shaft 1 by a first key 2, flange 3 being thus held from axial movement by bearing 19 and rotational movement with respect to the shaft 1 by key 2 while it rotates therewith. Concentrically mounted upon the outer portion of the back driving flange 3 there is an annular friction disc 6 attached thereto for rotation therewith. Also attached to back flange 3 is a first disc 4 for centering friction disc 6. A second, front driving flange 5 is connected to the shaft 1 for rotation therewith by a key 2', key 2' providing for the freedom of axial movement of flange 5 with respect to shaft 1. Front driving flange 5 is provided with a concentric friction lining 6' similar to lining 6 and with a centering disc 4', linings 6 and 6' frictionally engaging opposite sides of the body of the pinion 7.

The front driving flange 5 is thrust to the left by a nut 14 screwed upon the threaded righthand end 1' of the shaft 1. Nut 14 is held in adjusted position by a lock nut 14'. The nut 14 engages a plate or washer 13 the outer rim portion of which engages the front face of a disc 12 which is telescoped over a forwardly extending sleeve portion of the front driving flange 5. A plurality of coil compression springs 11 (one shown in FIG. 1) are disposed between disc 12 and front driving flange 5, springs 11 thrusting front flange 5 to the left with a force which is dictated by the adjustment of the nut 14. A plurality of studs 15 (one shown in FIG. 1) extend between disc 12 and flange 5 and are retained in place by flanges or heads on the front ends of the studs.

The above-described apparatus functions as follows: A torque exerted upon the driving shaft 1 is transmitted by keys 2, 2' to the back driving flange 3 and the front driving flange 5, respectively, such torque being transmitted by means of friction members 6 and 6' to the pinion 7. The circumferential force or torque of the driving pinion 7 is transmitted through a bushing or sleeve 8 and pin 9, which together constitute a tooth on the rack gear 10, so that when the shaft 1 and pinion 7 are driven in a clockwise direction, as shown in FIG. 2, with the pinion 7 and the teeth on the rack gear 10 in mesh, the rack gear 10 is driven to the right as indicated by the arrow. In such position of the parts the pinion 7 is disposed concentric with the shaft 1, and the clearance 18 between the radially inner boundary of the pinion 7 and the shaft 1 has a radial width which is uniform around its extent, as shown in FIG. 2.

In the embodiment shown, when pinion 7 is disposed in the position shown in FIGS. 1 and 2, one tooth 17' is disposed between and meshes with two successive teeth 8, 9 on the rack gear 10. When the rack gear 10 encounters an opposing force, directed to the left, which is greater than a desired predetermined force which is defined by the degree of tightening of the friction members 6, 6' against the sides of the pinion 7, the reaction between the right hand flank of the gear tooth 17' on the pinion 7 and the bushing or sleeve 8 of the tooth 8, 9 to the right of tooth 17' is such that as pinion 7 continues to turn clockwise the pinion is thrust progressively downwardly with respect to the driving shaft 1. One such position of the pinion 7, as it is being thrust downwardly away from the rack gear 10, is shown in FIG. 3. It is there apparent that the pinion 7 is now being progressively thrust into positions which are increasingly eccentric with respect to the shaft 1. The end, completely disengaged position of the pinion 7 with respect to the teeth 8, 9 on rack gear 10 is shown in FIG. 4 wherein the pinion 7 is shown completely out of mesh with the teeth on the rack gear 10, and the pinion has been thrust into a terminal eccentric position wherein the shaft 1 engages or substantially engages the inner surface of the pinion 7 which bounds the central opening or releasing space 18 thereof. In FIG. 4 the parts are depicted in the positions which they occupy when the shaft 1 has turned substantially 180° from the position thereof shown in FIGS. 1 and 2.

Upon the further turning of the shaft 1 through a total angle approaching 360°, the eccentricity between it and the pinion 7 progressively decreases until the pinion 7 is again restored to the position of FIGS. 1 and 2 wherein the teeth 17 thereon fully mesh with one or more of the teeth 8, 9 of the rack gear 10.

The above-described mechanism may be applied in any gearing system, such as the driving of trucks or other mechanisms, wherein the engagement and disengagement of gears in a radial direction may be advantageously employed, particularly when such meshing and unmeshing of the gears occurs repeatedly. Thus the mechanism may be used in a transport system in which a rail truck, provided with a rack gear, is driven; such driving means may be that according to the present invention wherein the gears are periodically meshed and unmeshed as the system is displaced along the track. In this manner there may be combined a downwardly inclined free track with a drive in an upwardly inclined track, or vice versa with braking in the downwardly inclined track. It is to be understood that one may even change the motion of the driving units by reversing mechanism.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. A mechanism for automatically engaging and disengaging two successive gears in a gear train, each of said gears having a plurality of teeth thereon, a first one of said gears being so constructed and arranged that the teeth thereon travel in a path fixed in space, the second of said gears being a pinion, means for mounting said pinion for movement radially thereof into meshing engagement with the first gear and for moving out of mesh with the first gear, a shaft, the pinion having a large central opening therethrough through which the shaft extends, said central opening in the pinion having a diameter such that it exceeds the diameter of the shaft by at least twice the radial height of the teeth on the pinion, friction means disposed to engage a side of the body of the pinion and drivingly connected to the shaft, and resilient means thrusting the friction means toward the pinion whereby the drive the pinion by the shaft, the engaging driving surfaces of the meshing teeth on the first and second gears being such that when the gears are in mesh and a driving force exists between the meshing teeth of the first and second gears, a radial force tending to thrust the second gear to a position eccentric of the shaft is exerted upon the second gear by at least one of the teeth of the first gear.

2. The gearing mechanism of claim 1 wherein the first gear is a rack gear, the shaft is a driving shaft, and the drive proceeds from the pinion to the rack gear.

3. The gearing mechanism of claim 1, wherein the friction means is disposed to engage opposite sides of the body of the pinion.

4. The gearing mechanism of claim 1, wherein the first and second gears are spur gears the teeth of which have flank surfaces, the flank surfaces of at least one tooth on each gear being in engagement when the gears are in mesh.

* * * * *